April 14, 1953  H. A. SAWYER, JR  2,634,913
CIRCULAR SLIDE RULE
Filed Oct. 20, 1950  3 Sheets-Sheet 1
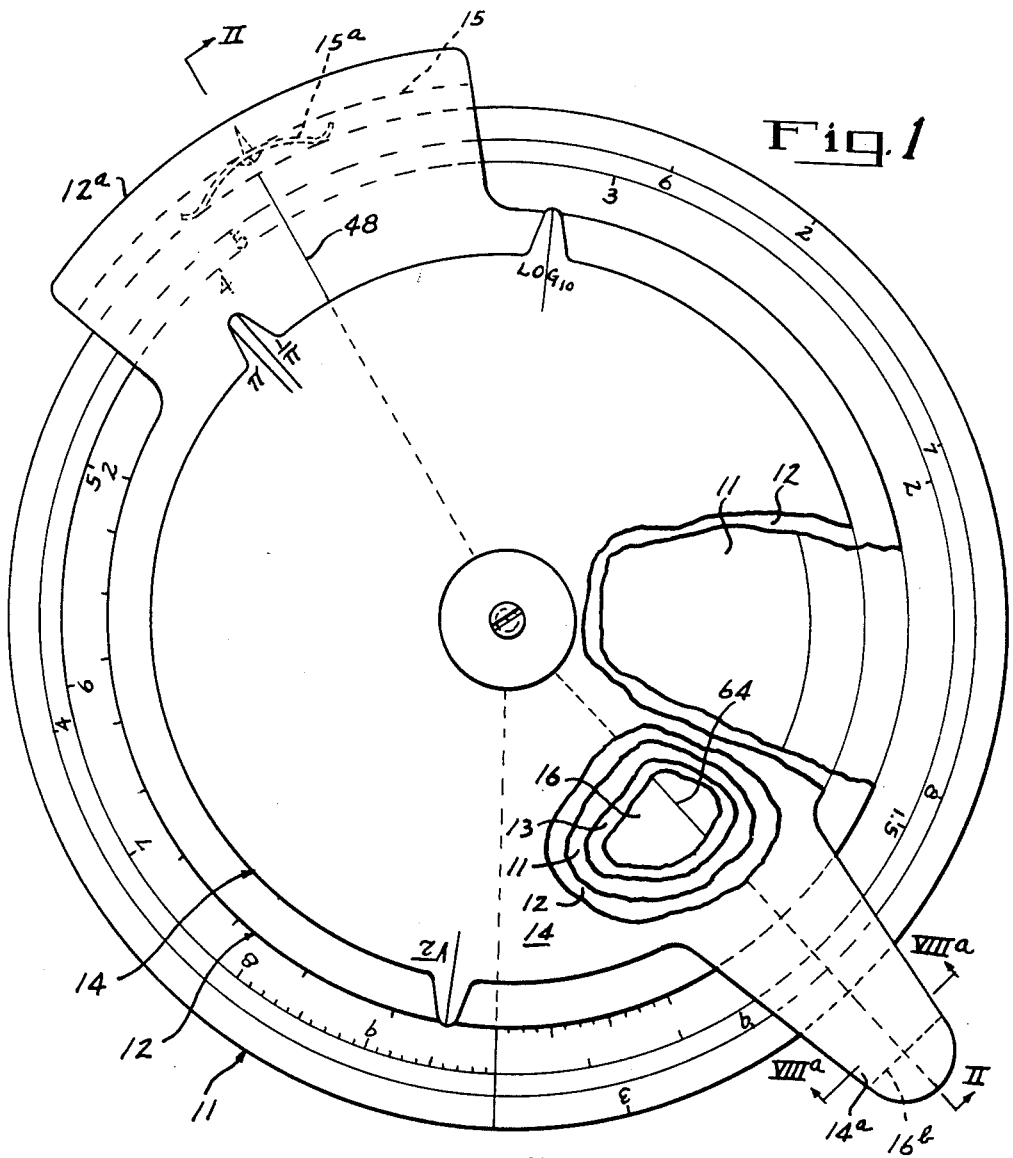
Fig. 1
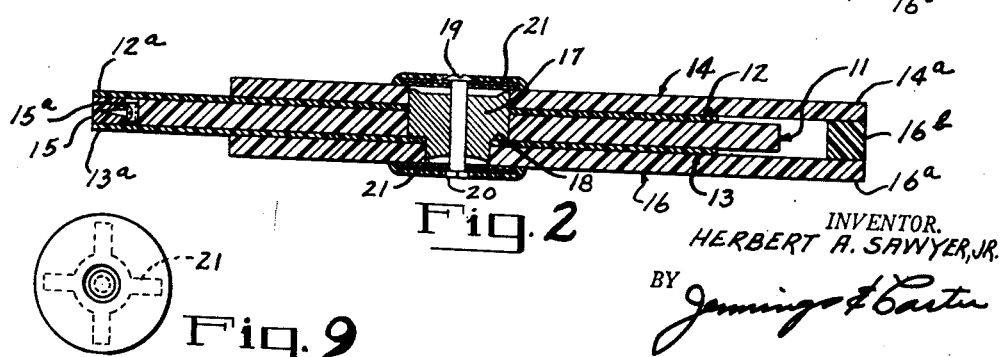
Fig. 2
Fig. 9
INVENTOR.
HERBERT A. SAWYER, JR.
BY Jennings & Carter
ATTORNEYS April 14, 1953     H. A. SAWYER, JR     2,634,913
CIRCULAR SLIDE RULE
Filed Oct. 20, 1950     3 Sheets-Sheet 2
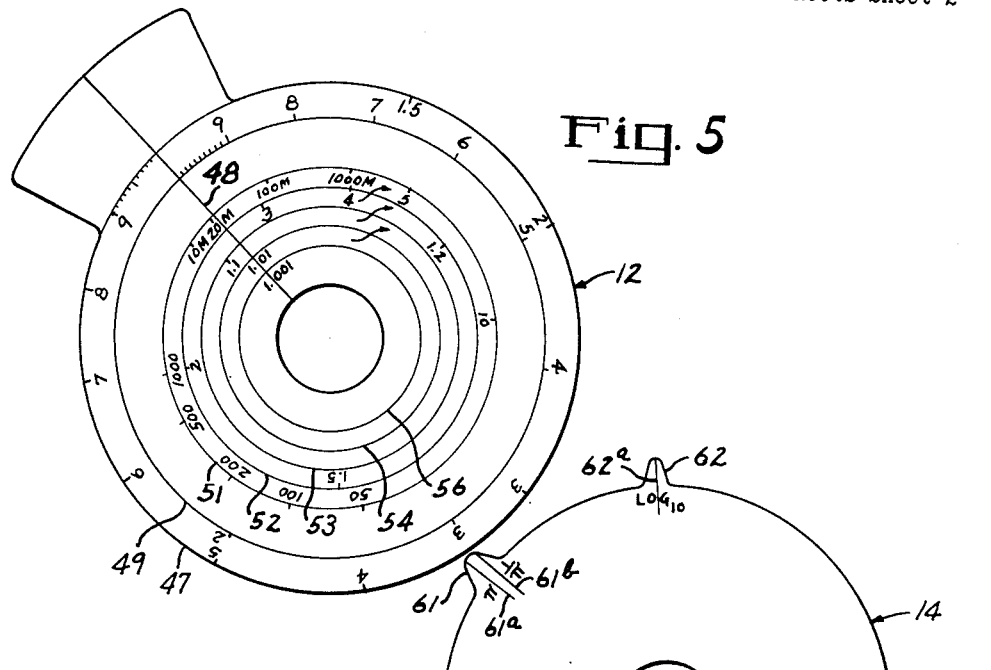
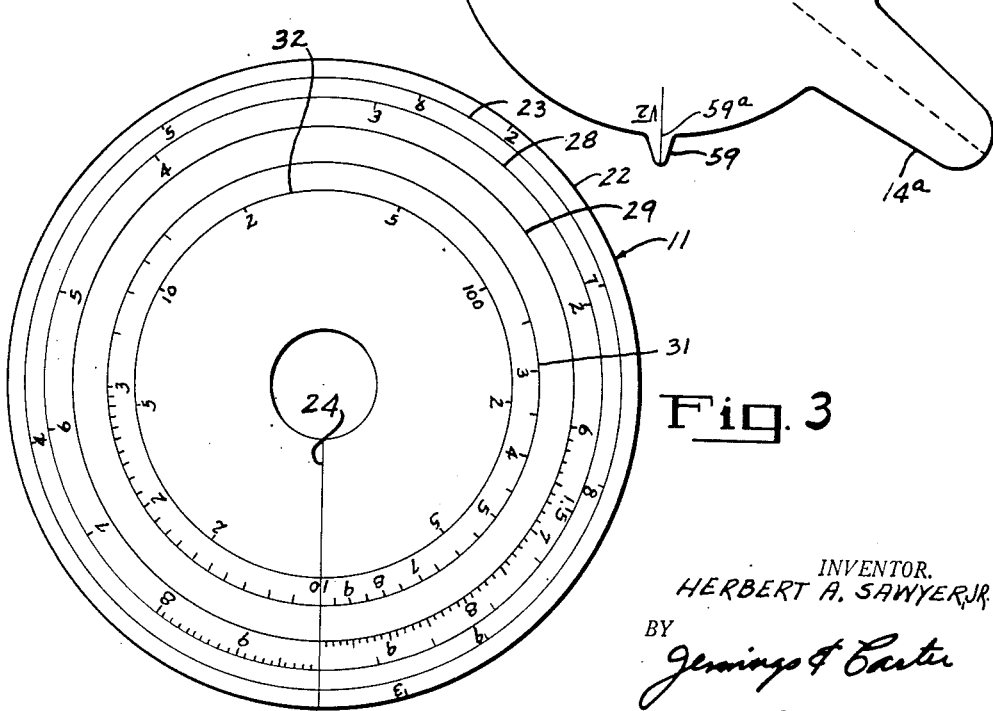
INVENTOR.
HERBERT A. SAWYER, JR.
BY Jennings & Carter
ATTORNEYS April 14, 1953     H. A. SAWYER, JR     2,634,913
CIRCULAR SLIDE RULE
Filed Oct. 20, 1950     3 Sheets-Sheet 3
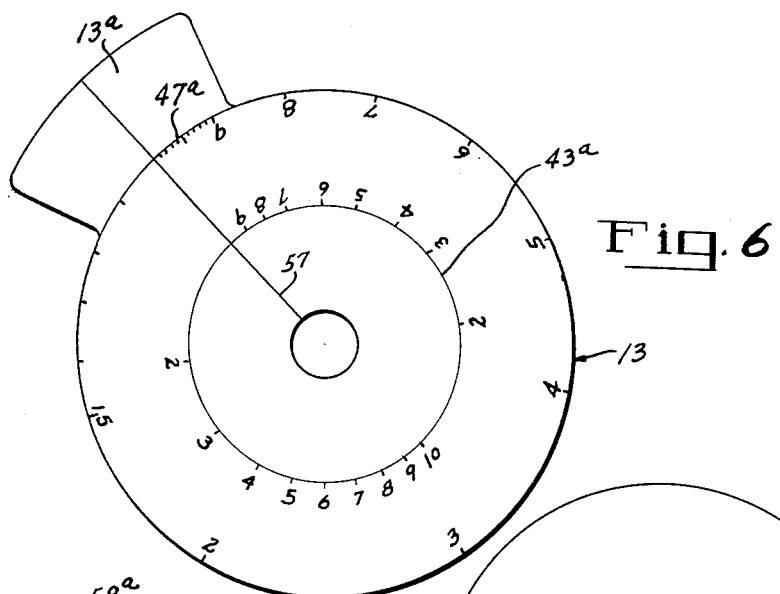
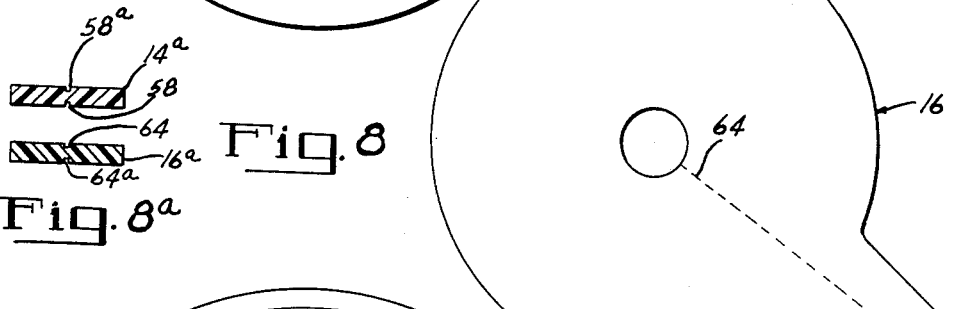
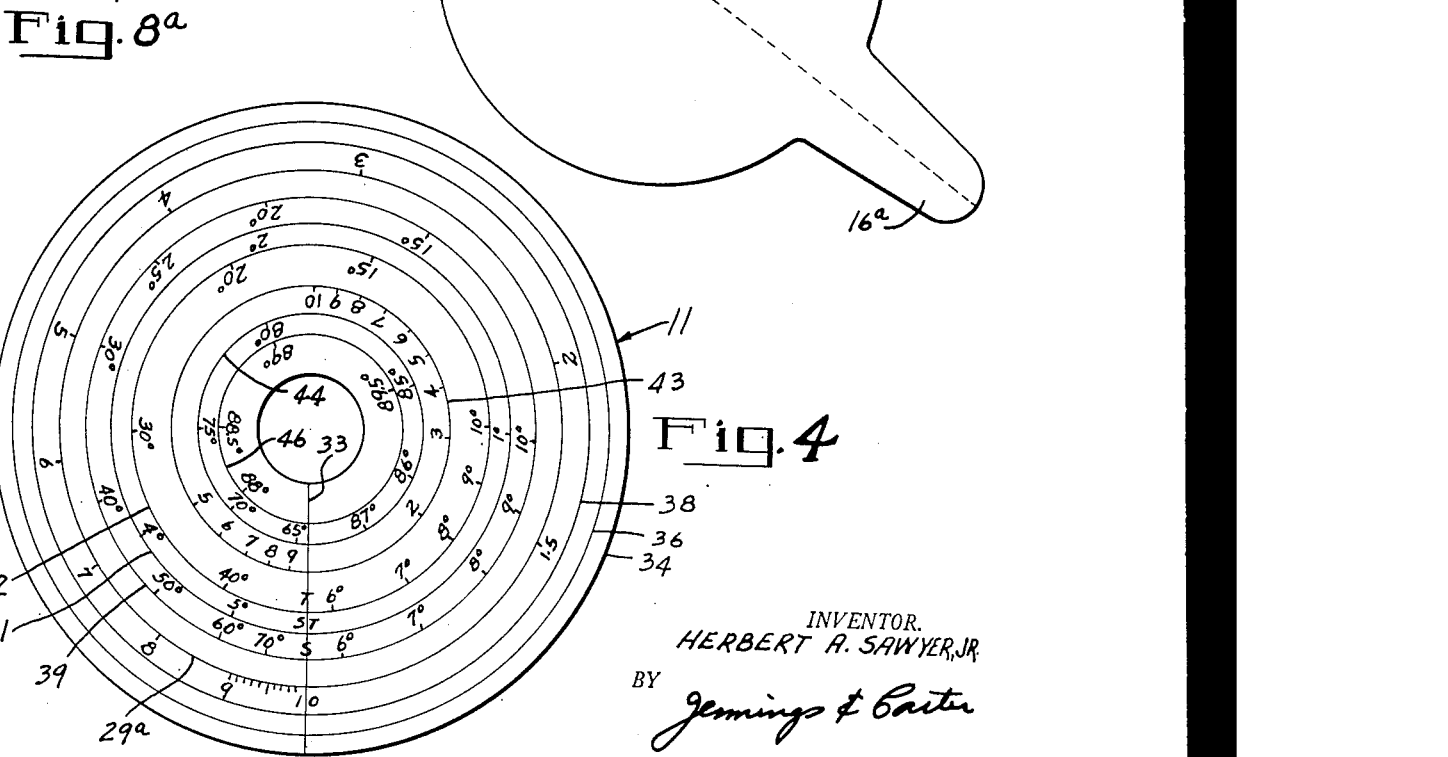
INVENTOR.
HERBERT A. SAWYER, JR.
BY Jennings & Carter
ATTORNEYS Patented Apr. 14, 1953

2,634,913

UNITED STATES PATENT OFFICE 2,634,913

CIRCULAR SLIDE RULE

Herbert A. Sawyer, Jr., Mansfield Center, Conn.

Application October 20, 1950, Serial No. 191,230

7 Claims. (Cl. 235—84)

My present invention relates to circular slide rules and has for an object the provision of a circular slide rule which shall be simple of construction and operation, more accurate than prior straight-type rules, and which incorporates useful scales relatively disposed in such manner as to make possible many computations heretofore not obtainable with either circular, straight or cylindrical rules and the performance of many computations with fewer settings than required heretofore on prior rules.

Another object is to provide a circular slide rule embodying an indicator which makes unnecessary the provision of the usual L, DF, CF and CIF scales, and yet so constructed and arranged that the omission of these scales detracts in no way from the usefulness of the rule, making the rule easier to use, and, more important, providing space for new and valuable scales.

Another object is to provide a slide rule of the character designated embodying a disc shaped indicator which may carry pre-set markings for the values of often used mathematical constants such as the values of $$\pi, \sqrt{2}, \pi/4, \text{ or } \frac{1}{\pi}$$

thereby providing in effect a third sliding scale and eliminating the necessity of hunting for these constants.

A further object is to provide a circular slide rule embodying the foregoing advantages and which is provided with scales immediately adjacent each other from which may be obtained versines and coversines of certain angles.

Still further and more general objects are to provide a circular slide rule which shall be compact and sturdy in construction; a rule in which the accuracy thereof is substantially unaffected by expansion or contraction of the scales due to different climatic conditions; a rule in which the scales are continuous, hence eliminating running off the scales in making computations; and a rule in which the scales are so arranged that confusion between the same is reduced to the minimum.

A slide rule illustrating the features of my invention is shown in the accompanying drawing forming a part of this application in which:

Fig. 1 is an enlarged plan view, partly broken away and looking at the front side of my improved slide rule;

Fig. 2 is a detail sectional view drawn to a smaller scale and taken generally along line II—II of Fig. 1;

Fig. 3 is a plan view of the front side of the main scale carrying or base disc;

Fig. 4 is a plan view of the back side of the main scale carrying disc;

Fig. 5 is a plan view of the scale disc which is super-imposed for rotation on the front of the main disc;

Fig. 6 is a plan view of the scale disc which is super-imposed for rotation on the rear side of the main disc;

Fig. 7 is a plan view of the indicator which is super-imposed for rotation on the scale disc shown in Fig. 5;

Fig. 8 is a plan view of the indicator disc which is super-imposed for rotation on the scale disc shown in Fig. 6;

Fig. 8a is a detail sectional view taken along line VIIIa—VIIIa of Fig. 1; and

Fig. 9 is a detail plan view of the centrally disposed pin and friction connection for holding the several parts assembled.

Referring now to the drawings for a better understanding of my invention and for the moment particularly to Figs. 1 and 2, my improved slide rule comprises a main scale carrying or base disc 11 of non-transparent material. Mounted for rotation relative to the base disc and on the front side thereof is a scale carrying disc 12 of transparent material. Mounted for rotation relative to the base disc on the rear side thereof is a scale disc 13 of transparent material. Mounted next adjacent the disc 12 is an indicator disc 14, and adjacent the disc 13 is an indicator disc 16 both of transparent material. The discs 12 and 13 are secured non-rotatably together by a block of material 15 glued or otherwise secured to peripherally projecting tabs or extensions 12a and 13a carried respectively by the discs 12 and 13. A leaf type friction spring 15a may be carried by the block 15, to engage the edge of the disc 11, thus to provide an additional amount of friction. The indicator discs 14 and 16 may be provided with peripherally extending tabs 14a and 16a, respectively, joined together by means of a block of material 16b.

The discs 12 and 13 are preferably the same diameter and preferably are of less diameter than the base disc 11. Similarly, the indicator discs 14 and 16 are preferably the same diameter and preferably are of less diameter than the discs 12 and 13. This arrangement of sizes makes possible the layout of scales in most convenient manner.

It will be understood that the several discs heretofore described are provided at their centers with suitable openings for receiving a bearing block 17. The disc 13 may be affixed to a shoulder 18 provided on the bearing block as by gluing the same thereto. The parts may be held assembled by means of a through screw 19 and a nut 20 therefor. If desired spring steel washers 21, imbedded in washers of resilient plastic, may be clamped against the indicator discs 14 and 16 by the screw 19, thus to resiliently hold the several parts together at the center.

The base disc 11 preferably is made of non-transparent material such as a milkwhite plastic, and may be on the order of one-quarter inch thick by 5 inches in diameter. All of the scales hereinafter to be described and placed on the disc 11 may conveniently be placed thereon in any suitable way such as by etching, and the scales and numbers associated therewith preferably are colored black and are upright when viewed from center of the disc.

Referring now particularly to Fig. 3 of the drawing the front side of the disc 11 is provided with a logarithmic scale 22 on the periphery thereof. Next inwardly from the scale 22 is a similar scale 23. The scales 22 and 23 commence at the radial index line 24 provided on the front surface of the disc 11, both of them being numbered clockwise. Reading from the line 24, scale 22 is numbered from 1 to 3.16, namely, from one to the square root of 10. Commencing at line 24 and reading clockwise, scale 23 is numbered from 3.16 to 10. Thus, the combined scales 22 and 23 read from 1 to 10, requiring two complete revolutions to go from 1 to 10. Mathematically stated, graduations for any number "$n$" on the scales 22 and 23 are placed at an angle of $4\pi \log_{10} n$ in radians from the index line 24.

Also laid on the front of the disc 11 are logarithmic scales 28, 29, 31 and 32. These scales correspond respectively to the CI, C and B and K scales of the ordinary rule except that their lengths are equal to the respective diameters thereof times $\pi$. It will be noted also that each of these scales commences at 1 on the line 24. Further, all of these scales are concentric with each other and all are struck from the center of the base disc 11.

Referring to Fig. 4 of the drawing the back side of the base disc has a radially disposed index line 33 on the surface thereof. The line 33 is precisely angularly coincident with the index line 24 on the front side of the base disc 11. All figures on the back side of the base disc are upright as viewed from the periphery of the disc.

Commencing at the periphery of the disc 11 on the back side thereof, I provide concentric scales 34, 36 and 38. Scales 34 and 36 are used to obtain hyperbolic sines and correspond to the usual Sh and Sh2 scales, respectively, found on prior art rules. The scale 38 is functionally similar to the hyperbolic tangent scale Th found on some existing rules.

Next inwardly from the scale 38 is a scale 29a, corresponding to scale 29, namely to the usual "C" scale of existing rules. It will be noted that this scale is numbered counter-clockwise from the line 33 from 1 to 10.

Inwardly of the scale 29a is a scale 39 laid out to obtain sines of angles from approximately 5° 40' to 90°. The scale corresponds in function to the "S" scale found on the usual slide rule. This scale increases numerically in a counterclockwise direction.

Next to scale 39 is a scale 41 from which may be obtained either sine or tangents of angles within a range of approximately 0° 34' to 5° 40'.

Next inwardly from scale 41 is a scale 42 from which may be obtained tangents of angles from approximately 5° 40' to 45°.

The three small diameter scales inwardly of scale 42 constitute a set of scales from which may be obtained, without reference to any other scales on the rule, versines or coversines of angles from approximately 64° 09' to approximately 89° 42'. In this set of scales the scale 43 is a reduced diameter scale corresponding to the scale 28 on the front side of the rule. The scale 44 commences on the index line 33 at approximately 64° 09' and is numbered clockwise to approximately 87° 26'. Scale 46 commences on line 33 at 87° 26' and is numbered clockwise to approximately 89° 42'. These scales are all concentric with each other and are likewise struck from the center of the disc 11. Mathematically stated, the scales 44 and 46 are laid out so that the graduation for a given angle is placed at $$-\pi[1+\log_{10}(1-\sin \text{ of angle})]$$

in radians measured clockwise from the index line 33. The functioning of these scales relative to each other will be described in connection with the operation of the rule.

Referring now more particularly to Fig. 5 of the drawing I will now describe the scales on the scale carrying disc 12 which as will be remembered is superimposed for rotation directly against the front side of the base disc 11. The scale carrying disc 12 has adjacent its periphery a scale 47 numbered clockwise from 1 to 10, commencing at a radially extending index line 48. Next inwardly of the scale 47 I may in certain cases provide a scale 49 which is numbered from 1 to 10 counterclockwise commencing at the index line 48. Inwardly of the scale 49 are scales 51 to 56, inclusive, which constitute a set of "log-log" scales. These scales are laid out so that any given number thereon lies in radial alignment with the corresponding log to the base $e$ of the given number as read on the scale 47. Stating it differently, a radial line passing through a given number on any one of the scales 51 to 56, inclusive, also passes through the log of that number to the base $e$ as read on scale 47.

As shown in Fig. 6 the scale disc 13 is preferably equal in diameter to the scale disc 12. The disc 13 carries a radial index line 57. The periphery of disc 13 is laid out to provide a scale 47a corresponding to scale 47 except that the same is numbered from 1 to 10 in the counter-clockwise direction from the line 57. The scales 47 and 47a thus are substantially the same diameter. Further, the index lines 48 and 57 are angularly superimposed and are held in this position by properly aligning the discs 12 and 13 before inserting and fixing the block 15. Disc 13 is also provided with a scale 43a, similar to the scale 43 on the disc 11 and which is laid out from the index line 57 in a counterclockwise direction.

Referring now to Fig. 7 the front indicator disc 14 has a radially extending indicator line 58 thereon located at the center of the projecting tab 14a and on the under or far side of tab and disc. The line 58a, is a dotted or intermittent line on top surface of disc 14, angularly coincident with line 58. There are a plurality of peripherally disposed outwardly extending projecting ears or tabs 59, 61, 62 and 63, provided on the periphery of the indicator disc 14. The tab 59 carries a radially extending hair line 59a which is located at a counterclockwise angle in radians from the index line 58 of $2\pi \log_{10} \sqrt{2}$. The tab 61 has two radial hair lines 61a and 61b representing the value of $$\pi \text{ and } \frac{1}{\pi}$$

located at counterclockwise angles of $2\pi \log_{10} \pi$ and $$2\pi \log_{10} \frac{1}{\pi}$$

respectively. Similarly, tabs 62 and 63 carry hair lines 62a and 63a, respectively, located at counterclockwise angles from line 58 or $$2\pi \log_{10} \log_{10} e$$

and $$2\pi \log_{10} \frac{\pi}{4}$$

All lines on these tabs are on the under side of the tabs. In the manner later to appear these tabs and the lines carried thereon are extremely useful in making certain computations involving the constants named.

As shown best in Fig. 8a the indicator disc 16 carries a radially extending index line 64a. The line 64a preferably is dotted, and preferably is located substantially at the center of the tab 16a.

In order to prevent error due to parallax, on the under-surface of the indicator discs 14 and 16, immediately beneath the respective broken lines 58a and 64a, there are continuous or unbroken reference lines 58 and 64, respectively. These lines are superimposed under the dotted lines whereby the instrument may be read accurately by aligning the dotted and continuous lines, effectively eliminating error due to parallax. Discs 12 and 13 are made thin, for instance, about $\frac{1}{16}$ inch so as to reduce this error to minimum when the operator fails to align lines 58, and 58a, or lines 64 and 64a.

From the foregoing the method of operation and the advantages of my improved slide rule may now be explained and understood. By the provision of the relatively wide tabs 12a and 13a carried by the respective discs 12 and 13, the operator uses the rule by grasping these tabs in the left hand. This makes the discs 12 and 13 correspond to the body portion of the usual straight slide rule. The base disc 11 therefore corresponds to the slide portion of the ordinary slide rule, while the index tabs 14a and 16a correspond in a general way to the hair line indicator or slide usually provided on prior art straight rules. It will be remembered that the discs 12 and 13 are tied together through the block 15 and that the indicator discs 14 and 16 are similarly secured together by the block 16b. It will be noted that the tabs 14a—16a are radially longer than the tabs 12a—13a. This permits the tabs 12a—13a to pass between the tabs 14a—16a, permitting 360° rotation of the sets of discs 14—16 and 12—13 relative to each other.

In order to demonstrate the simplicity and versatility of operation of the improved rule a few representative problems which may be solved therewith are given below:

Multiplication: $2 \times 8$. Using the front side of the rule, set index line 24 on "2" of scale 47 carried by the scale disc 12. Read answer on scale 47 opposite "8" on scale 29 of base disc 11.

Division: 256 divided by 14. Set indicator line 58 carried by the indicator 14, or any of the lines 59a through 63a, on "256" of scale 47 carried by the disc 12. Set the numeral "14" on scale 29 of disc 11 under indicator line employed. Read answer under index line 24 from scale 47.

Combination of multiplication and division: $22 \times 44 \div 12$. Set indicator line 58 on "22" of scale 47. Set "12" on scale 29 under indicator line 58. Move indicator until one of the indicator lines 58 or 59a to 63a, inclusive, is over "44" of scale 29. Read answer from scale 47 under indicator line employed.

Logarithmic functions: Log to the base 10 of 50. Set indicator line 58 at "50" on scale 51. Read answer (complete with characteristic) from scale 47 directly under line 62a. Thus, line 62a replaces "log" scale on usual rule.

Multiplication of three numbers: $355 \times 60 \times 25$. Set index line 58 or either of the lines 59a to 63a, inclusive, carried by the indicator 14 on "355" of scale 47. Set "60" of scale 28 under the same indicator line selected. Set any indicator line carried by the indicator disc 14 to "25" on scale 29 and read answer under the same indicator line from scale 47.

Combination of cube-root and multiplication:

$$\sqrt[3]{5} \times 2.6$$

Set index line 24 on "2.6" of scale 47. Set index line 58 of the indicator 14 on "5" of scale 32. Read answer under same indicator line from scale 47.

Raising number to a power, multiplication and division: $27^2 \times 4 \div 56$. Set index line 58 over "4" on scale 47. Rotate base disc 11 until "56" of scale 29 thereof is aligned beneath the same index line. Move line 58 to "27" on scale 22. Read answer under line 58 from scale 47.

Multiplication of "pi" times a number raised to the second power: $\pi \times 16^2$. Set line 58 of disc 14 on "16" of scale 22. Read answer opposite line 61a from scale 29. Thus line 61a and 61b replace folded scales on usual rule.

Raising a number to a fractional power: $56^{2.45}$. Set line 24 of base disc 11 on "56" of scale 51. Set index line 58 at "2.45" on scale 29. Read answer beneath line 58 from scale 51.

The following problems are illustrative of the scales on the back side of the rule. To obtain the sine of any angle over 64°. Sine 86°. Set index line 64, on "86" of scale 44. Read coversine from scale 43 under line 64. Subtract answer from 1 to obtain sine of 86°. Versine of 4° equals coversine of 86°, thus these scales may be used with equal facility for obtaining versines.

Obtaining the cotangent squared of an angle: $\cot^2 50°$. Set index line 64 carried by indicator 16 at "40°" on scale 42. Read answer from scale 43; or, invert rule and read answer from scale 31. For cotangent cubed 50°, simply invert rule and read answer from scale 32 under index line 58.

Finding the angles of a right triangle with one leg and hypotenuse given:

(1) If leg and hypotenuse are nearly equal: leg=11.20, hypotenuse=11.46. Set indicator line 64 at the difference, "0.26," on scale 43a. Set index line 33 of disk 11 at "11.46" of scale 43a. Read angle opposite the leg at indicator line 64 on scale 44. (This angle cannot be obtained with sufficient accuracy on previous slide rules.)

(2) If leg and hypotenuse are not nearly equal: leg=11.20, hypotenuse=18.65. Set indicator line 64 at "18.65" on scale 47a of disk 13. Set "11.20" on scale 29a of disk 11 under indicator line 64. Read angle opposite leg at index line 57 of disk 13 on scale 39 of disk 11.

Division by the square root of two: 8.39÷√2. Set line 59a of disc 14 on "8.39" of scale 47 of disc 12. Read answer at indicator line 58 of disc 14 on scale 47.

Raising to the sixth power: 1.56⁶. Set indicator line 58 on "1.56" of scale 22 on disc 11. Read answer at same indicator line on scale 32 of disc 11.

Multiplication and division to four-place accuracy: 3.356×5.159÷2.883. Set index line 48 of disc 12 on "3.356" of scale 23 on disc 11. Set indicator line 58 of disc 14 on "2.883" of scale 22. Rotate disc 11 until "5.159" of scale 23 is under indicator line 58, and read answer at index line 48 on scale 23 of disc 11.

From the foregoing the method of constructing and using my improved rule is believed to be readily apparent. It will be understood that I may prefer to color the scales and portions of the several discs different colors, thereby to make the same more readily distinguishable. Also, I may color around index lines 24 and 33 so that orientation of disc 11 is readily apparent at all times to user. It is to be especially noted that the groups of scales 43, 43a, 44 and 46 provide means for obtaining, and performing computations involving the coversines of angles. From these scales the sines of angles over 64° and the cosines of angles less than 26° may be obtained to a degree of accuracy required for many useful computations. This degree of accuracy is not attainable on any previous slide rule. While the scales 46 and 44 may be used with scale 43 it will be apparent that the rule may be inverted and the corresponding reading taken from scale 23 on the front side of the rule. This is possible because of the fact that the index lines 33 and 24 are coincident, and because of the fact that scale 43 reads from 1 to 10 in a counter-clockwise direction as the rule is viewed from the back and front sides, respectively. This general arrangement holds true with respect to several of the scales on the front and back sides of the rule. Thus, by placing the index lines 33 and 24 at the same angular position whereby they are coincident, I have greatly simplified the slide rule and have made it more versatile. The use of the lines 59a, 61a, 62a and 63a, namely those on the indicator 14, for the constant represented by each, greatly simplifies the making of computations involving these constants. Likewise, and as has been pointed out, it is possible in many computations to use the lines 59a to 63a as the main index line. This eliminates having to rotate the discs more than a minimum amount to bring a reference line into juxtaposition to the number on the scale being used in computing the problem.

In the foregoing specification and the appended claims it will be understood that terms "front side" and "back side" are relative only and are used merely for the purpose of aiding in describing the parts of the rule.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In a circular slide rule, a base scale carrying disc of relatively thick non-transparent material, intermediate discs immediately adjacent the front and back surfaces of the base disc made of relatively thin transparent material and of a diameter no greater than the diameter of the base disc, indicator discs of transparent material thicker than the intermediate discs and disposed immediately against the outer surfaces of the intermediate discs, means passing through the center of said discs and holding the base disc, intermediate discs, and indicator discs relatively rotatable to each other, means securing the intermediate discs non-rotatably together, means securing the indicator discs non-rotatably together, circular logarithmic scales on the base and intermediate discs, and sets of angularly coincident radial index lines on the front and back surfaces of the base disc and the intermediate discs and indicator discs, said scales on the base and intermediate discs commencing and ending at the respective index lines thereon.

2. A slide rule as defined in claim 1 in which the intermediate discs are of less diameter than the base disc and in which the indicator discs are of less diameter than the intermediate discs.

3. A slide rule as defined in claim 1 in which the means securing the two intermediate discs and the two indicator discs non-rotatably together comprises peripherally disposed tabs on each of said discs projecting past the edge of the base disc, and connecting means joining the tabs of said pairs of discs together, the joined tabs of said intermediate discs being radially shorter than the tabs of the indicator discs permitting the sets of joined tabs to rotate past each other.

4. In a circular slide rule, a base disc of non-transparent material carrying circular logarithmic scales concentrically disposed on the front side thereof, a radially disposed index line on the front of said base disc at which the scales thereon begin and end, a radially disposed index line on the back surface of said base disc angularly coincident with the index line on the front side thereof, a logarithmic scale on the back surface of said base disc increasing in numerical value in an opposite angular direction relative to its index line than do the scales on the front surface of the base disc relative to their radial index line, intermediate discs of relatively thin transparent material mounted on the front and back sides of the base disc at the center of the base disc for rotation relative thereto, logarithmic scales on the intermediate discs complementary to the adjacent logarithmic scales on the base disc, peripherally disposed tabs on the intermediate discs projecting past the periphery of the base disc, means securing the tabs together, radially disposed coincident index lines on the intermediate discs, indicator discs of relatively thick transparent material mounted for rotation at the center of the base and intermediate discs in contact with the outer surfaces of the latter, means securing the indicator discs together for rotation one with the other, and coincident radially disposed index lines on the indicator discs.

5. In a circular slide rule, a base disc of non-transparent material having radially disposed index lines on its front and back surfaces, said lines being angularly coincident with each other, a two revolution concentrically arranged circular logarithmic scale on the front of the base disc adjacent its periphery, said scale commencing at unity on the index line and ending at 10 thereat, a second scale in the form of a single revolution circular logarithmic scale on the front of the base disc inwardly of the first named scales numbered in the reverse angular direction as the first named scales from 1 to 10 commencing and ending at said index line, a third logarithmic scale on the front of the base disc similar to the second named scale and numbered in the opposite direction commencing and ending at the index line on the front of the base disc, a fourth logarithmic scale on the front of the base disc inwardly of the third scale and similar thereto except that it is numbered from 1 to 100, a fifth logarithmic scale on the front of the base disc numbered in the same direction as the third scale from 1 to 1000 commencing and ending at the index line on the front of the base disc, a circular logarithmic scale on the back side of the base disc identical to the third scale on the front side thereof except that it is numbered in an opposite direction therefrom from 1 to 10 commencing and ending at the index line on the back side, rotatable discs of transparent material mounted against the front and back sides of the base disc and carrying scales corresponding respectively to the third scale on the front and the scale on the back of said base disc, said rotatable discs carrying radial index lines at which the scales thereon commence and end, means securing the rotatable discs non-rotatably together with the index lines thereon angularly coincident, rotatable indicator members of transparent material mounted over the rotatable discs, radial index lines on each indicator member, and means securing the indicator members non-rotatably together with the index lines thereon angularly coincident.

6. A circular slide rule as defined in claim 5 in which the back side of the base disc is provided with circular scales from which the coversines of angles may be obtained.

7. A circular slide rule as defined in claim 6 in which the coversine scales comprise concentric scales numbered consecutively with reference to said index line on the back side of the base disc from approximately 64° 09′ to approximately 89° 42′, and in which there is provided a logarithmic scale from which the coversine of an angle within the above given range may be read.

HERBERT A. SAWYER, Jr.

References Cited in the file of this patent

UNITED STATES PATENTS

| Number | Name | Date |
|---|---|---|
| 922,465 | Fenn | May 25, 1909 |
| 1,207,439 | Picolet | Dec. 5, 1916 |
| 1,780,078 | Hite | Oct. 28, 1930 |
| 2,451,842 | Liebmann et al. | Oct. 19, 1948 |
| 2,481,846 | King | Sept. 13, 1949 |

FOREIGN PATENTS

| Number | Country | Date |
|---|---|---|
| 109,107 | Great Britain | Sept. 6, 1917 |
| 533,660 | France | Dec. 19, 1921 |